No. 677,709. Patented July 2, 1901.
G. B. STACY.
AUTOMATIC TANK PUMP FOR AUTOMOBILES.
(Application filed Nov. 13, 1900.)
(No Model.)

WITNESSES:

INVENTOR
George B. Stacy
BY
ATTORNEYS

THE NORRIS PETERS CO., PHOTO-LITHO., WASHINGTON, D. C.

UNITED STATES PATENT OFFICE.

GEORGE B. STACY, OF BOSTON, MASSACHUSETTS, ASSIGNOR TO
ALEXANDER H. SPENCER, OF NEW YORK, N. Y.

AUTOMATIC TANK-PUMP FOR AUTOMOBILES.

SPECIFICATION forming part of Letters Patent No. 677,709, dated July 2, 1901.

Application filed November 13, 1900. Serial No. 36,356. (No model.)

*To all whom it may concern:*

Be it known that I, GEORGE BLAIR STACY, a citizen of the United States, and a resident of Boston, in the county of Suffolk and State of Massachusetts, have invented a new and Improved Automatic Tank-Pump for Automobiles, of which the following is a full, clear, and exact description.

The invention relates to automobiles having an explosive mixture of air and gas as the motive agent.

The object of the invention is to provide a new and improved pump completely under the control of the operator in charge of an automobile and actuated while the automobile is in motion by one of the wheels thereof, the pump being designed to fill the air-tank with air under the desired pressure to insure proper working of the motor employed for propelling the vehicle.

The invention consists of novel features and parts and combination of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
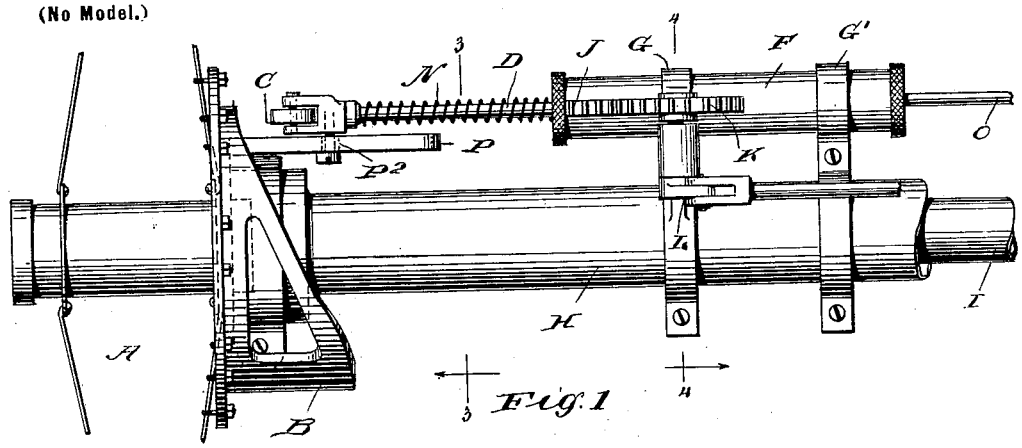
Figure 2:
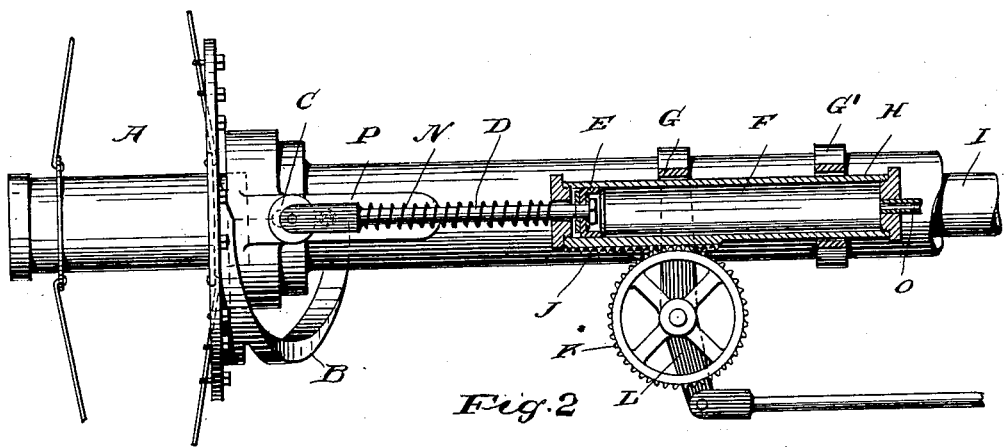
Figure 3:
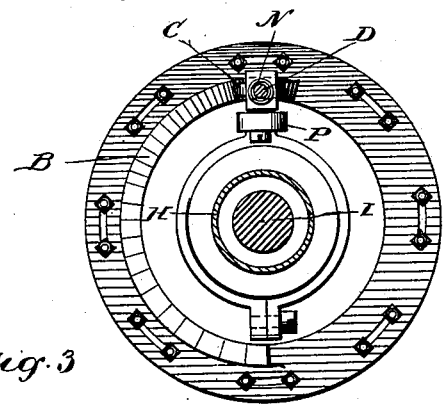
Figure 4:
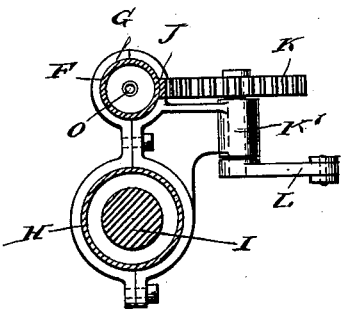
Figure 5:
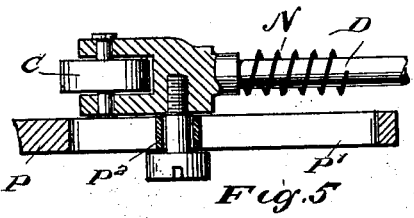

Figure 1 is a side elevation of the improvement as applied. Fig. 2 is a sectional plan view of the same. Fig. 3 is a cross-section of the same on the line 3 3 in Fig. 1. Fig. 4 is a like view of the same on the line 4 4 in Fig. 1, and Fig. 5 is an enlarged sectional side elevation of the guideway for the pump-rod.

On one of the wheels A of the vehicle is secured a cam B, on which is adapted to travel an antifriction-roller C, journaled in the outer end of a plunger-rod D, carrying a plunger E, contained within the cylinder F of the air-pump. The cylinder F is mounted to slide in the direction of its length in bearings G G', attached to a fixed sleeve H, through which extends the axle I of the wheel A. On the outside of the cylinder F is secured a rack J, in mesh with a gear-wheel K, having its shaft K' journaled in the bearing G, and on said shaft is secured a crank-arm L, connected by links or other devices with a hand-lever or the like under the control of the operator in charge of the automobile. A spring N is actuated from the plunger-rod D and presses with one end on the cylinder F and with its other end on the head of the plunger-rod, so as to normally hold the plunger E in an outermost position in the cylinder F, as is plainly shown in Fig. 2.

When the operator actuates the hand-lever mentioned, then the gear-wheel K is turned and the rack J and the cylinder F are shifted to change the position of the cylinder F, the plunger-rod E, plunger-rod D, and the roller C relatively to the cam-wheel B to increase or diminish the stroke of the plunger in the cylinder, when the wheel A rotates and the cam B imparts an inward-sliding motion to the plunger and the spring N imparts a return motion to the plunger. During the return stroke of the plunger air is drawn into the inner end of the cylinder past the plunger E, and during the inward stroke of the plunger, caused by the action of the cam B on the roller C, the air is forced out of the cylinder into a pipe O, connected with the air reservoir or tank of the motor.

In order to properly guide the plunger-rod D, a guideway P is secured to the sleeve H and is formed with an elongated slot P', engaged by an antifriction-roller P², held on the plunger-rod D, to guide the latter during its travel and to prevent it from turning, and thereby maintain the antifriction-roller C in proper position relatively to the face of the cam B. The antifriction-roller is mounted on a screw-bolt whose enlarged head works in contact with the inner side of the guideway P, so that the head of the piston-rod is prevented from movement in any lateral direction, however rough or uneven the roadway may be. It is understood that when the vehicle is in use the wheel A actuates the pump during each revolution of the wheel, so that the desired amount of air in the air-tank is maintained to insure the proper formation of the explosive mixture used as the motive agent for propelling the vehicle. By the operator shifting the cylinder the stroke of the pump is increased or diminished, and consequently more or less air is pumped to the tank to maintain a uniform air-pressure in the tank.

The device is very simple and durable in construction, can be readily applied to a vehicle, is not liable to get out of order, and is completely under the control of the operator for the purpose mentioned.

Having thus fully described my invention, I claim as new and desire to secure by Letters Patent—

1. In an automatic pump for the air-tank of an automobile, the combination, with a running wheel and a cam fixed thereon, of a pump-cylinder fixed as to rotation, a piston working therein and having a rod adapted to engage the cam, a slotted guideway fixed parallel to the piston-rod, a projection on said rod which works in said slot and is provided with a head working on the inner side of the guideway, substantially as shown and described.

2. In an automatic pump for the air-tank of an automobile, the combination, with the wheel, cam, cylinder, and piston having a rod engaging the cam and working loose in the cylinder-head, of a guide for the rod in its reciprocations, said guide being fixed between the cam-wheel and cylinder so that it is engaged by the head of the rod, as shown and described.

3. An automatic pump for the air-tank of automobiles, comprising a longitudinally-movable pump-cylinder, a plunger movable therein, a cam on one of the wheels of the automobile and engaging the outer end of the plunger-rod, and means under the control of the operator, for shifting said cylinder toward or from said cam, to increase or diminish the stroke of the plunger in the said cylinder, as set forth.

4. An automatic pump for the air-tank of automobiles, having a cylinder movable relatively to its plunger, to increase or diminish the stroke of the plunger in the cylinder, the said means comprising a rack on the cylinder, and a gear-wheel in mesh with the rack, and adapted to be turned by the operator in charge of the automobile, as set forth.

In testimony whereof I have signed my name to this specification in the presence of two subscribing witnesses.

GEORGE B. STACY.

Witnesses:
THEO. G. HOSTER,
EVERARD BOLTON MARSHALL.